United States Patent [19]

Nishimura et al.

[11] Patent Number: 4,459,374

[45] Date of Patent: Jul. 10, 1984

[54] FOUNDRY BINDER COMPOSITION

[75] Inventors: Toshiaki Nishimura; Toshiyuki Tachikawa, both of Fujieda, Japan

[73] Assignee: Sumitomo Durez Company, Ltd., Tokyo, Japan

[21] Appl. No.: 483,405

[22] Filed: Apr. 8, 1983

[30] Foreign Application Priority Data

Apr. 9, 1982 [JP] Japan .................................. 57-58039

[51] Int. Cl.³ .............................................. C08K 3/36
[52] U.S. Cl. ..................................... 523/143; 524/595
[58] Field of Search .......................................... 523/143

[56] References Cited

U.S. PATENT DOCUMENTS 3,432,457 3/1969 Robins .................................. 523/143
3,702,316 11/1972 Robins .................................. 523/143
4,311,631 1/1982 Myers et al. ......................... 523/143

Primary Examiner—Lewis T. Jacobs
Attorney, Agent, or Firm—James F. Tao; James F. Mudd

[57] ABSTRACT

This invention is concerned with foundry binder compositions for alkaline aggregates such as reclaimed sand, Olivia sand, alumina sand, etc., which cure at ambient temperatures. The binder composition is composed of phenolic resins, polyisocyanates and a hydrogen chloride emitting substance upon hydrolysis. Curing of this composition is by gaseous amines. The hydrogen chloride emitting substance on hydrolysis is selected from the following:

(a)

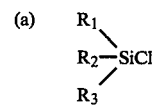

wherein $R_1$, $R_2$, $R_3$ can be selected from: Hydrogen, Chlorine, alkyl, vinyl or alkoxy, or (b) Thionyl chloride, sulfuryl chloride, acid chlorides of sulfur, such as methyl chlorosulfuric acid, ethyl chlorosulfuric acid.

16 Claims, No Drawings

FOUNDRY BINDER COMPOSITION

BACKGROUND OF THE INVENTION

This invention relates to an improved foundry binder composition for ambient temperature curing, and especially for alkaline aggregates such as reclaimed sand, Olivin sand, alumina sand, etc.

Conventional foundry binders for ambient temperature curing are classified under two types; one is inorganic binders, typified as water glass, and the other is organic binders, such as the acid curing type and urethane forming type. While inorganic binders scarcely impair the environment of workshop because then emit few toxic gases when used, the molds obtained therefrom are poor in the shake-out property after pouring. Thus, difficulties in the shake-out property reduce the availability of utilization of the reclaimed sand.

On the other hand for organic binders, acid-curing binders made of phenolic resins and furan resins require large quantity of strong acids at the curing thereof, and this causes corrosion on the equipment, and an irritant gas at pouring is emitted, although these binders are excellent in the shake-out property of the molds therefrom.

A method of ambient-temperature-curing is known for producing foundry molds with a binder system comprising the reaction of polyols of a phenolic resin or an oil modified alkyd resin with a polyisocyanate in the presence of liquid amines or metal naphthenates, and this method is useful in a large dimensional molding with compact equipment. However, since this method necessitates a long curing time, it cannot be employed for a commercial stage production of the molds.

A method for commercially producing foundry molds under ambient-temperature-curing is called "gas-curing mold forming process", which allows a high productivity with a rapid mold forming cycle by passing gaseous amines into a mixture of foundry aggregates in the presence of both a phenolic resin as a polyol component and a polyisocyanate. This system is widely used into the foundry industries because of its energy-saving. However, when highly alkaline sand typified as reclaimed sand, Olivin sand, alumina sand, etc. having the pH value of 7 or more, is employed as foundry aggregates, even in coating thereof with a binder, the obtained coated sand is often so degraded that it is useless in mold forming because a prior reaction of the phenolic resin with the liquid polyisocyanate of binder components. This occurs by means of a catalytic behavior of said alkaline composition in silica sand.

This is an accelerated urethane forming reaction affecting flow of obtained coated sand, and this fails in smoothness of mold surface as well as strength of the molds obtained therefrom. Therefore, cast articles made of said molds are likely to have defects such as an irregular surface, occlusion of sand thereinto, etc. Said degradation often occurs during a hot-humid summer season, at excessively elevated temperature of sand, or in a high content of said alkaline composition in silica sand. This results in the fact that said urethane forming reaction depends on temperature as well as an existing quantity of catalytic substances. So, to suppress said urethane forming reaction, a method is known to incorporate an acidic substance into a phenolic resin component of binders for neutralizing said alkaline composition of silica sand. However, when said acidic substance is short of the neutralizing equivalent, it is not effective.

On the contrary, when it is excessive, said phenolic resin component spontaneously give rise to a condensation reaction which enables the component to be useless as a binder. There is a method by incorporating said acidic substance into a liquid polyisocyanate component of binders, however, in the method the activated hydrogen of said acidic substance reacts with isocyanate groups which results not only in a poor reactivity thereafter, but, an inert precipitation occurs at mixing with a phenolic resin component.

A method is also known that a small quantity of said acidic substance is directly incorporated into a mixer when coating sand with both a phenolic resin and a liquid polyisocyanate component. However, this method requires additional equipment, and the operation therefor becomes complicated. Furthermore, this method is essentially difficult in mixing as dispersing small quantities of said acidic substance homogeneously in a large quantity of formulation is not a practical solution.

The present invention results from an investigation to overcome these drawbacks. The inventors have found that the incorporation of a substance that will emit an acid upon hydrolysis will neutralize the alkaline components present.

SUMMARY OF THE INVENTION

This invention is concerned with a foundry binder compositions for ambient temperature curing, with special emphasis upon alkaline aggregates such as reclaimed sand, etc. A binder system curable by gaseous amines, contains phenolic resin, polyisocyanate and a hydrogen chloride emitting substance upon hydrolysis. This hydrogen chloride emitting substance is selected from:

wherein
$R_1$, $R_2$, $R_3$, are selected from hydrogen, chlorine, alkyl, vinyl or alkoxy, or
thionyl chloride, sulfuryl chloride, acid chlorides of sulfur, such as methyl chlorosulfuric acid, ethyl chlorosulfuric acid, etc.

DETAILED DESCRIPTION OF THE INVENTION

The present invention relates to a foundry binder composition employed for mold forming comprising a phenolic resin with a liquid polyisocyanate cured under a gaseous amine, wherein a potentially hydrogen-chloride-emitting substance at hydrolysis is present. An object of the present invention is to enable said substance to emit hydrogen chloride at hydrolysis due to moisture contained in air or the silica sand during mixing. An additional object of the present invention is to suppress the urethane forming reaction of coated sand prior to mold forming by neutralizing an alkaline composition of silica sand with emitted hydrogen chloride so that it can suppress degradation of binder components as much as possible.

Phenolic resins hereof are any of the following three types of phenolic resins which are employed either independently or jointly; a novolac type phenolic resin, a resole type phenolic resin and a benzylic-ether type phenolic resin. Above all, a benzylic-ether type phenolic resin is preferable. The inventors hereof will explain each embodiment for preparing these phenolic resins as follows:

(a) a novolac type phenolic resin hereof is prepared by reacting phenols with aldehydes in the presence of inorganic acids such as hydrochloric acid, sulfuric acid, etc., or organic acids such as para-toluene sulfonic acid, oxalic acid, etc.

(b) A resole type phenolic resin hereof is prepared by reacting phenols with aldehydes in the presence of basic substances such as ammonia, and either oxides or hydroxides of alkali metals.

(c) A benzylic-ether type phenolic resin hereof is prepared by reacting phenols with aldehydes within the pH value range of 4 to 7 in the presence of naphthenates, carboxylates, and/or either oxides or hydroxides of divalent metals. If necessary, carboxylic acids or hydrochloric acid, etc. May be added thereto. The resin obtained is identified by an absorption of benzylic-ether linkage at 1060 cm$^{-1}$ in an infra-red spectrometry.

Phenols used herein are phenol, or alkyl phenols such as cresol, xylenol, etc., or a mixture thereof.

Aldehydes used herein are formalin, paraformaldehyde, or formaldehyde-emitting substances such as trioxane, or a mixture thereof.

Phenolic resins used herein are preferably prepared in a homogeneously dissolved form of an inorganic solvent so that the viscosity thereof is adjusted to be 10 poise at 25° C. or less.

Usable organic solvents used herein are alcohols, ketones, esters, aromatic hydrocarbons, and a mixture thereof, however, those having a high boiling point are preferable in the present invention because of suppressing degradation of coated sand obtained.

Liquid polyisocyanates used herein are any of aliphatic, alcyclic or aromatic polyisocyanates having at least two isocyanate groups therein, preferably diphenylmethane diisocyanate, triphenylmethane triisocyanate, polymethylene polyphenylisocyanate, and/or a mixtures thereof. Alternatively, the polyisocyanate can be dissolved in an aromatic solvent for ease of incorporation.

Gaseous amines employed herein for a reaction catalyst of binder components, phenolic resin and liquid polyisocyanate, are methyl amine, dimethyl amine, trimethyl amine, ethyl amine, diethyl amine, triethyl amine, dimethyl ethyl amine, etc. The incorporating proportion ranges of both a liquid polyisocyanate and an amine to 100 parts of a phenolic resin as its solid content are 18 to 550 parts by weight of a polyisocyanate, and 2.5 to 125 parts by weight of an amine, respectively. However, 90 to 365 parts of a polyisocyanate and 7.5 to 75 parts by weight of an amine, are the preferred proportion.

Hydrogen-chloride-emitting substances at hydrolysis according to the present invention to suppress the degradation of coated sand have the following each generic formula:

(a) Silanes

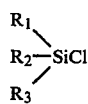

where, $R_1$, $R_2$, $R_3$ are selected from hydrogen chlorine, alkyl group, vinyl group, and alkoxy group, and they are either identical or different.

(b) Thionyl chloride, sulfuryl chloride, acid chlorides of sulfur such as methyl chlorosulfuric acid, ethyl chlorosulfuric acid, etc., or a mixture thereof.

The proper time for incorporating said hydrogen-chloride-emitting substances thereinto is optional; during preparation of a polyisocyanate, by dissolving same into an organic solvent, or at mold forming. It goes without saying that residual chlorides remaining in polyisocyanate are also inclusive in the present invention. Said hydrogen-chloride-emitting substances at hydrolysis according to the present invention are preferably contained in the liquid polyisocyanate component and the content thereof is so adjusted that the proportion range in 100 parts by weight of said polyisocyanate to said substances is 0.1 to 7 parts by weight, preferably 0.15 to 4 parts by weight. When the proportion range is less than 0.1 parts by weight, there is no effect to suppress said degradation. When it is more than 7 parts by weight, an excessive quantity of hydrogen chloride emitted endangers the environment of workshop and may corrode the facilities thereof.

The sum of incorporating proportion range of a liquid polyisocyanate containing said hydrogen-chloride-emitting substances and a phenolic resin as the solid content to 100 parts by weight of silica sand is 0.1 to 6 parts by weight, preferably 0.2 to 3 parts by weight. When the proportion is less than 0.1 parts by weight, the obtained molds therefrom are poor in strength, and when it is more than 6 parts by weight, this impairs the shake-out property of the molds.

The composition according to the present invention is effective when the pH value of silica sand is less than 7.

The inventors hereof will explain more details of the present invention with the following nonlimitative Examples and Comparative Example, wherein "parts" and "percent" represent "parts by weight" and "percent by weight", respectively.

PREPARATION EXAMPLE 1

Preparation of a phenolic resin

To a four-necked flask with a relux cooler and a stirrer, 1000 parts of phenol, 1500 parts of 37% formalin are charged. After the pH value range thereof was adjusted to 5.0 to 6.0 by adding 6 parts of zinc acetate and 10% sodium hydroxide solution thereinto, the mixture was reacted at 98° to 100° C. for 60 minutes. The reaction was continued until the temperature reached 135° C. under distilling water and unreacted phenol. At 135° C., 1000 parts of xylene and 300 parts of diethyl ketone, pre-mixed, were added thereinto, and the reaction mixture was dissolved by stirring. Then, it was cooled to ambient temperature. A phenolic resin obtained and an absorption of benzylic-ether linkage at 1060 mm$^{-1}$ identified by an infra-red spectrometry.

Preparation of liquid polyisocyanate A

Into 40 parts of a mixed solution of xylene and mineral spirit (mixing proportion of xylene to mineral spirit was 7 to 3), 100 parts of a polyisocyanate consisting mainly of diphenylmethane diisocyanate were dissolved. After the solution became homogeneous, 1.4 parts of vinyl trichlorosilane were added thereto as a hydrogen-chloride-emitting substance at hydrolysis. Thus, liquid polyisocyanate A was obtained.

Preparation of liquid polyisocyanate B

Into 40 parts of a mixed solution of xylene and mineral spirit (mixing proportion of xylene to mineral spirit was 7 to 3), 100 parts of a polyisocyanate consisting mainly of diphenylmethane diisocyanate were dissolved. After the solution became homogeneous, 1.4 parts of thionyl chloride were added thereto as a hydrogen-chloride-emitting substance at hydrolysis. Thus, liquid polyisocyanate B was obtained.

Preparation of liquid polyisocyanate C

Into 40 parts of a mixed solution of xylene and mineral spirit (mixing proportion of xylene to mineral spirit was 7 to 3), 100 parts of a polyisocyanate consisting mainly of diphenylmethane diisocyanate were dissolved. Thus, liquid polyisocyanate C was obtained.

EXAMPLES AND COMPARATIVE EXAMPLES

For two kinds of sand, reclaimed sand (pH value of 10.7) and Olivin sand (pH value of 9.2), experiments were run, respectively. To 3000 parts of sand in a bench scale whirl-mixer with rotating speed of 150 rpm, 45 parts of said phenolic resin and 45 parts of liquid polyisocyanate A hereof were added. The mixture was further mixed well for 1 minute and coated sand was obtained. Test specimens were prepared with the coated sand according to a method explained later.

The results obtained are shown in Table 1.

Except for changing liquid polyisocyanate A to liquid polyisocyanate B and C, the same formulation and procedures were taken, respectively. The results obtained are also shown in Table 1.

TABLE 1

| Liquid isocyanate employed | Sand employed | Compressive strength of mold (kg/cm$^2$) | | | | | |
|---|---|---|---|---|---|---|---|
| | | Lapse of time from molding directly after mixing | | | Lapse of time from mixing to molding | | |
| | | Directly after | 1 hour's after | 24 hours' after | 20 minutes' after | 40 minutes' after | 90 minutes' after |
| A | Reclaimed | 52.2 | 55.8 | 63.2 | 59.3 | 56.3 | 50.4 |
|   | Olivin | 53.2 | 68.3 | 72.3 | 67.3 | 63.1 | 58.2 |
| B | Reclaimed | 50.4 | 53.4 | 60.8 | 58.1 | 54.3 | 48.0 |
|   | Olivin | 52.6 | 67.3 | 73.4 | 67.2 | 61.5 | 55.4 |
| C | Reclaimed | 47.3 | 52.2 | 57.2 | 38.2 | 29.3 | 15.2 |
| (Comparative) | Olivin | 52.8 | 68.0 | 71.4 | 57.1 | 44.6 | 18.3 |

As clearly shown in Table 1, the composition according to the present invention have improved properties and results.

TEST METHODS USED FOR TABLE I

Methods for preparing test specimen

Coated sand after lapse of determined time was charged into a mold having 50 mm in diameter and 50 mm in depth. The charged coated sand was rammed until the depth reached 50 mm.

A saturated gaseous triethyl amine was prepared by dried air and a liquid triethyl amine.

The gaseous triethyl amine was passed through the mole for 15 seconds so that molded coated sand was cured. Molded article thus obtained was taken out of the mold and it was employed at test specimen.

Determination of compressive strength

Each test specimen after lapse of determine time was set into an Amsler type universal testing machine, and the compressive strength at breach was determined.

Method for determining pH value

Into 50 g of water 50 g of silica sand was charged. The mixture was stirred well. After it was left still until sand settles, pH value of the upper water phase was determined by a glass-electrode type apparatus.

We claim:

1. A foundry binder composition for mold formation comprising phenolic resin, polyisocyanate, a potentially hydrogen chloride emitting substance at hydrolysis, wherein the proportion of hydrogen chloride emitting substance to 100 parts by weight of polyisocyanate is about 0.1 to about 7 parts by weight.

2. A foundry binder composition according to claim 1 wherein said potentially hydrogen chloride emitting substance at hydrolysis is selected from:

(a) 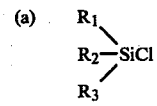

where $R_1$, $R_2$, $R_3$ are selected from hydrogen, chlorine, alkyl, vinyl and alkoxy, $R_1$, $R_2$, and $R_3$, or (b) thionyl chloride, sulfuryl chloride, methyl chlorosulfuric acid or ethyl chlorosulfuric acid.

3. A foundry binder composition according to claim 1, wherein said hydrogen chloride emitting substance is present in a liquid polyisocyanate.

4. A foundry binder composition according to claim 2, wherein said hydrogen chloride emitting substance is present in a liquid polyisocyanate.

5. A foundry binder composition for mold formation according to claim 1, wherein said hydrogen chloride emitting substance is selected from the following generic formula:

where $R_1$, $R_2$, $R_3$ are selected from hydrogen, chlorine, alkyl, vinyl or alkoxy.

6. A foundry binder composition according to claim 3, wherein said hydrogen chloride emitting substance is selected from the following generic formula:

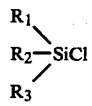

where $R_1$, $R_2$, $R_3$ are selected from hydrogen, chlorine, alkyl, vinyl or alkoxy.

7. A foundry binder composition according to claim 1, wherein said hydrogen chloride emitting substance is selected from: thionyl chloride, sulfuryl chloride, methyl chlorosulfuric acid or ethyl chlorosulfuric acid.

8. A foundry binder composition according to claim 3, wherein said hydrogen chloride emitting substance is selected from: thionyl chloride, sulfuryl chloride, methyl chlorosulfuric acid or ethyl chlorosulfuric acid.

9. A foundry binder composition for mold formation comprising a benzylic ether group containing phenolic resin, polyisocyanate, vinyl trichlorosilane as hydrogen chloride emitting substance at hydrolysis, said vinyltrichlorosilane is in proportion of about 0.15 to about 4 parts per 100 parts polyisocyanate, and said binder added to silica sand in the ratio of about 0.1 to about 6 parts polyisocyanate and vinyl trichlorosilane per 100 parts sand.

10. A foundry binder composition for mold formation comprising a benzylic ether group containing phenolic resin, polyisocyanate, thionyl chloride as hydrogen chloride emitting substance at hydrolysis, said thionyl chloride is in proportion of about 0.15 to about 4 parts per 100 parts polyisocyanate, and said binder added to silica sand in the ratio of about 0.1 to about 6 parts polyisocyanate and thionyl chloride per 100 parts sand.

11. A process for preparing shaped foundry molds which comprises:
(a) forming a foundry mix containing at least 90% by weight foundry aggregates by distributing thereon phenolic resin;
(b) mixing therewith a polyisocyanate containing hydrogen chloride emitting substance, said hydrogen chloride emitting substance present in the range of about 0.1 to 7 parts by weight per 100 parts by weight polyisocyanate;
(c) shaping said foundry mix in a mold; and
(d) passing gaseous amine curing agent through said mold to bind the shaped foundry mix.

12. A process for preparing shaped foundry molds according to 11 wherein the hydrogen chloride emitting substance is vinyl trichlorosilane and is in the range of about 0.15 to about 4 parts per 100 parts polyisocyanate.

13. A process for preparing shaped foundry molds according to claim 11 wherein the hydrogen chloride emitting substance is thionyl chloride, said thionyl chloride is in range of about 0.15 to about 4 parts by weight per 100 parts polyisocyanate.

14. A shaped foundry mold produced in accordance with the process of claim 11.

15. A shaped foundry mold produced in accordance with the process of claim 12.

16. A shaped foundry mold produced in accordance with the process of claim 13.

* * * * *